United States Patent
Andersen et al.

(10) Patent No.: US 8,590,673 B2
(45) Date of Patent: Nov. 26, 2013

(54) MANUAL WHEEL CHOCKS WITH AUTOMATIC POSITIVE LOCKING

(75) Inventors: Jonathan Andersen, Racine, WI (US);
Timothy Cotton, Milwaukee, WI (US);
Norbert Hahn, Franklin, WI (US);
Joseph A. Manone, Mequon, WI (US);
Kyle E. Nelson, Cedarburg, WI (US);
Reinhard E. Sander, Wauwatosa, WI (US)

(73) Assignee: Rite-Hite Holding Corporation, Milwaukee, WI (US)

(*) Notice: Subject to any disclaimer, the term of this patent is extended or adjusted under 35 U.S.C. 154(b) by 1016 days.

(21) Appl. No.: 12/026,008

(22) Filed: Feb. 5, 2008

(65) Prior Publication Data
US 2009/0194375 A1    Aug. 6, 2009

(51) Int. Cl.
*B60T 3/00*    (2006.01)

(52) U.S. Cl.
USPC .................. 188/32; 188/5; 188/36; 414/396; 414/401; 414/584

(58) Field of Classification Search
USPC .......... 188/32, 36, 5; 414/401, 396, 584, 809
See application file for complete search history.

(56) References Cited

U.S. PATENT DOCUMENTS

| | | | |
|---|---|---|---|
| 3,305,049 A * | 2/1967 | Willey | 188/32 |
| 5,096,021 A * | 3/1992 | Tart | 188/32 |
| 5,249,905 A | 10/1993 | Warner et al. | |
| 5,302,063 A * | 4/1994 | Winsor | 410/30 |
| 5,375,965 A * | 12/1994 | Springer et al. | 414/809 |
| 5,454,682 A | 10/1995 | Alexander | |
| 5,582,498 A * | 12/1996 | Springer et al. | 414/401 |
| 5,709,518 A | 1/1998 | Alexander et al. | |
| 5,743,697 A * | 4/1998 | Alexander | 414/401 |

(Continued)

FOREIGN PATENT DOCUMENTS

| | | |
|---|---|---|
| CN | 1735525 | 2/2006 |
| DE | 4120035 | 12/1992 |

(Continued)

OTHER PUBLICATIONS

International Searching Authority, "International Search Report," issued in connection with international application No. PCT/US2009/033100, mailed Apr. 4, 2009, 4 pages.

(Continued)

*Primary Examiner* — Thomas J Williams
*Assistant Examiner* — Mariano Sy
(74) *Attorney, Agent, or Firm* — Hanley, Flight & Zimmerman, LLC.

(57) ABSTRACT

A wheel restraint includes a wheel chock that is manually movable between a retracted position clear of a wheel of a vehicle at a loading dock and an operative position to block the path of the wheel. In the retracted position, the chock can be manually moved freely along a track that is mounted to a driveway of the dock. When the chock is manually moved from its retracted position to its operative position, a locking feature automatically restricts the movement of the chock relative to the track. When the chock is manually moved back to its retracted position, the locking feature automatically disengages. Although the wheel chock is connected to a track, most of the force exerted by the wheel against the chock is transmitted directly from the chock to the driveway.

23 Claims, 5 Drawing Sheets

(56) References Cited

U.S. PATENT DOCUMENTS

| | | | |
|---|---|---|---|
| 5,896,957 A * | 4/1999 | Berends et al. ................. 188/32 |
| 5,927,928 A | 7/1999 | Hageman et al. |
| 5,934,857 A * | 8/1999 | Alexander .................... 414/401 |
| 6,082,952 A | 7/2000 | Alexander |
| 6,092,970 A * | 7/2000 | Hahn et al. ..................... 414/401 |
| 6,773,221 B2 * | 8/2004 | Belongia et al. ............. 414/401 |
| 7,032,720 B2 | 4/2006 | Jette et al. |
| 7,152,830 B2 * | 12/2006 | Dowell et al. ............. 246/415 R |
| 2002/0037209 A1 | 3/2002 | Hageman et al. |
| 2002/0141852 A1 | 10/2002 | Hahn et al. |
| 2005/0133315 A1 | 6/2005 | Hoofard |
| 2009/0194376 A1 * | 8/2009 | Brooks et al. .................. 188/32 |
| 2010/0170754 A1 | 7/2010 | Brooks et al. |
| 2011/0162916 A1 | 7/2011 | Saliger et al. |

FOREIGN PATENT DOCUMENTS

| | | |
|---|---|---|
| DE | 4120035 A1 * | 12/1992 |
| DE | 4427406 | 10/1995 |
| EP | 0937669 | 8/1999 |
| EP | 1112950 | 4/2001 |
| FR | 2736336 | 1/1997 |

OTHER PUBLICATIONS

International Searching Authority, "Written Opinion of the International Searching Authority," issued in connection with international application No. PCT/US2009/033100, mailed Apr. 4, 2009, 12 pages.

International Searching Authority, "Corrected International Search Report," issued in connection with international application No. PCT/US2009/033100, mailed Apr. 15, 2009, 6 pages.

International Searching Authority, "Corrected Written Opinion of the International Searching Authority," issued in connection with international application No. PCT/US2009/033100, mailed Apr. 15, 2009, 9 pages.

International Searching Authority, "International Search Report," issued in connection with international application serial No. PCT/US2010/021823, mailed May 11, 2010, 4 pages.

International Searching Authority, "Written Opinion of the International Searching Authority," issued in connection with international application serial No. PCT/US2010/021823, mailed May 11, 2010, 8 pages.

International Bureau, "International Preliminary Report on Patentability," issued in connection with international application serial No. PCT/US2009/033100, mailed Aug. 19, 2010, 10 pages.

International Bureau, "International Preliminary Report on Patentability," issued in connection with international application serial No. PCT/US2010/021823, issued Aug. 9, 2011, mailed Aug. 18, 2011, 9 pages.

Australian Government IP Australia, "Examination Report," issued in connection with Australian application serial No. 2010210919, issued Feb. 27, 2012, 2 pages.

United States Patent and Trademark Office, "Restriction Requirement," issued in connection with U.S. Appl. No. 12/365,330, mailed Mar. 13, 2012, 8 pages.

Australian Government IP Australia, "Examination Report," issued in connection with Australian application serial No. 2009212478, issued Apr. 3, 2012, 2 pages.

United States Patent and Trademark Office, "Non-Final Office Action," issued in connection with U.S. Appl. No. 12/365,330, mailed Jun. 21, 2012, 43 pages.

United States Patent and Trademark Office, "Final Office Action," issued in connection with U.S. Appl. No. 12/365,330, mailed Dec. 7, 2012, 17 pages.

United States Patent and Trademark Office, "Non-Final Office Action," issued in connection with U.S. Appl. No. 12/690,555, mailed Nov. 30, 2012, 8 pages.

United States Patent and Trademark Office, "Notice of Allowance," issued in connection with U.S. Appl. No. 12/690,555, mailed Apr. 5, 2013, 26 pages.

Canadian Intellectual Property Office, "Office Action," issued in connection with Canadian application serial No. 2,751,591, issued Jan. 17, 2013, 2 pages.

United States Patent and Trademark Office, "Non-Final Office Action," issued in connection with U.S. Appl. No. 12/365,330, issued Feb. 11, 2013, 22 pages.

Final Office Action, issued by the United States Patent and Trademark Office in connection with U.S. Appl. No. 12/365,330, on May 23, 2013, 13 pages.

Notice of Allowance, issued by the Australian Intellectual Property Office in connection with Australian Patent Application No. 2009212478, on Jun. 6, 2013, 4 pages.

Non-final Office Action, issued by the United States Patent and Trademark Office in connection with U.S. Appl. No. 12/365,330, on Aug. 20, 2013, 12 pages.

First Chinese Office Action, issued by the State Intellectual Property Office of China P.R. in connection with Chinese Patent Application No. 201080015090.1, on Aug. 22, 2013, 12 pages.

* cited by examiner

MANUAL WHEEL CHOCKS WITH AUTOMATIC POSITIVE LOCKING

FIELD OF THE DISCLOSURE

The subject disclosure generally pertains to restraining vehicles at loading docks and, more specifically, to manually operated wheel chocks.

BACKGROUND OF RELATED ART

When a truck, trailer or some other vehicle is parked at a loading dock, often a vehicle restraint is used to keep the truck from inadvertently moving away from an elevated platform of the dock. Preventing the vehicle from inadvertently moving forward allows a forklift truck to safely drive between the dock platform and the truck for the purpose of loading or unloading the cargo inside the truck.

A variety of vehicle restraints are available that can be installed at a loading dock. For example, a vehicle restraint can include an ICC-style restraint that engages a truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint. Moreover, ICC bars are not prevalent outside the United States, so in those cases a wheel restraint can be used for blocking one or more of the truck's wheels. Perhaps the most common wheel restraint is simply a wheel chock that wedges between the driveway and the underside of the wheel. However, wheel chocks often slip out of position on driveways that are slippery due to oil, rain, ice, sand, gravel or dirt. Moreover, wheel chocks usually are loose items that do not permanently attach to the loading dock area, so they often get misplaced.

DESCRIPTION OF THE PREFERRED EXAMPLES

FIGS. 1-6 show a wheel restraint system 10 for restraining at least one wheel 12 of a vehicle 14 at a loading dock 16. Restraint 10 includes a wheel chock 18 that can be manually positioned adjacent (e.g., forward of) wheel 12 and selectively moved manually between an operative position obstructing wheel 12 and a retracted position clear of wheel 12. Chock 18 is illustrated in the retracted position in FIGS. 1, 3 and 5 and is illustrated in an operative position in FIGS. 2, 4 and 6. In the operative position, chock 18 obstructs wheel 12 to restrain vehicle 14 and help prevent it from inadvertently moving away from dock 16 so that cargo can be safely conveyed on and off of the vehicle. In the retracted position, wheel chock 18 is clear of wheel 12 to allow vehicle 14 to freely enter and leave the dock area.

So that the position of wheel chock 18 can be adjusted or aligned with respect to the location of wheel 12, chock 18 is attached to a track follower 20 that can travel along a track 22 mounted to a driveway 24 of dock 16. A set of rollers or slide blocks 26 can facilitate the translation or movement of track follower 20.

To help manually move wheel chock 18 between its retracted and operative positions, a lever 28 is pivotally coupled to track follower 20 via a pin 30 and coupled to a rod 32 via a pin 34 and a slot 36. Rod 32 extends from wheel chock 18 and can slide in and out through a hole 38 defined in a guide plate 40. The guide plate 40 rigidly extends from track follower 20. Manually tilting lever 28 from its position shown in FIGS. 1 and 3 to its position shown in FIGS. 2 and 4 moves wheel chock 18 from its retracted position to its operative position. A second rod 42 rigidly extending from wheel chock 18 is slidably coupled to plate 40 helps guide and support wheel chock 18.

Wheel restraint 10 also includes a locking feature 44 so that once wheel chock 18 is properly positioned somewhat adjacent to but more forward than wheel 12, locking feature 44 automatically restrains track follower 20 to track 22 as wheel chock 18 is manually moved from its retracted to operative position. While the mechanics of the locking feature may vary, locking feature 44 basically moves between an engaged position (FIGS. 2, 4 and 6) to limit the track follower's movement and a disengaged position (FIGS. 1, 3 and 5) to permit free movement of track follower 20 along track 22. In some examples, locking feature 44 is a tab 46 extending from the lower end of lever 28. However, in other examples, the locking feature can include features such as, but not limited to, a tooth, protrusion, pin, hole, slot, or any other member that can engage a complementary mating feature.

Figure 1:
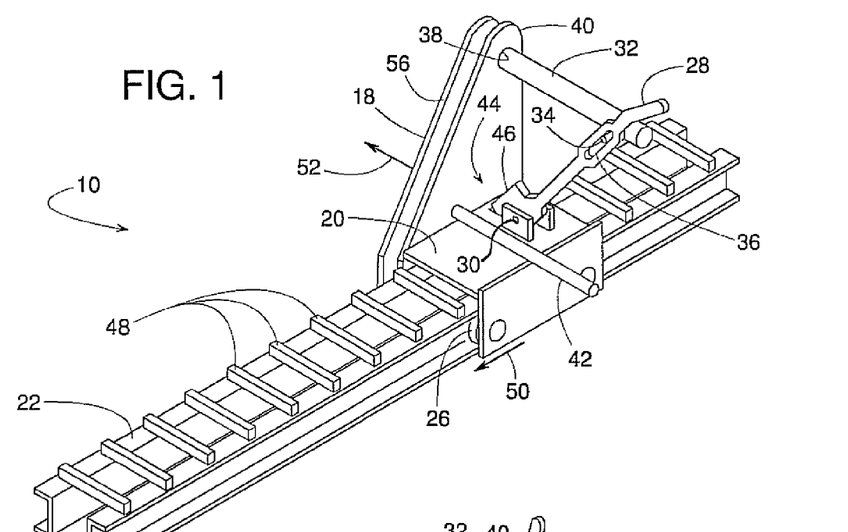
FIG. 1 is a perspective view of an example manual wheel restraint illustrated in a retracted position.
Figure 2:
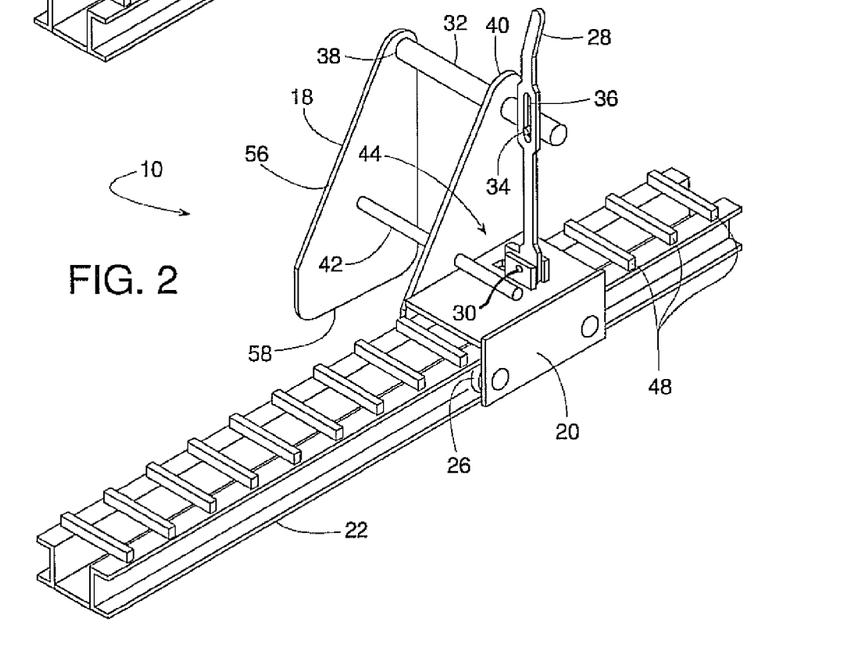
FIG. 2 is a perspective view similar to FIG. 1 but with the restraint in an operative position.
Figure 3:
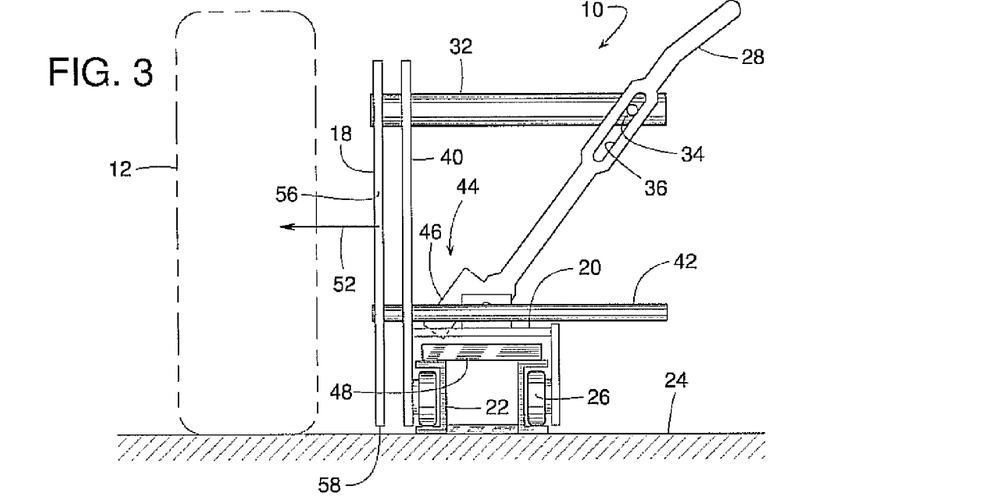
FIG. 3 is a front view of the example manual wheel restraint shown in the position of FIG. 1.
Figure 4:
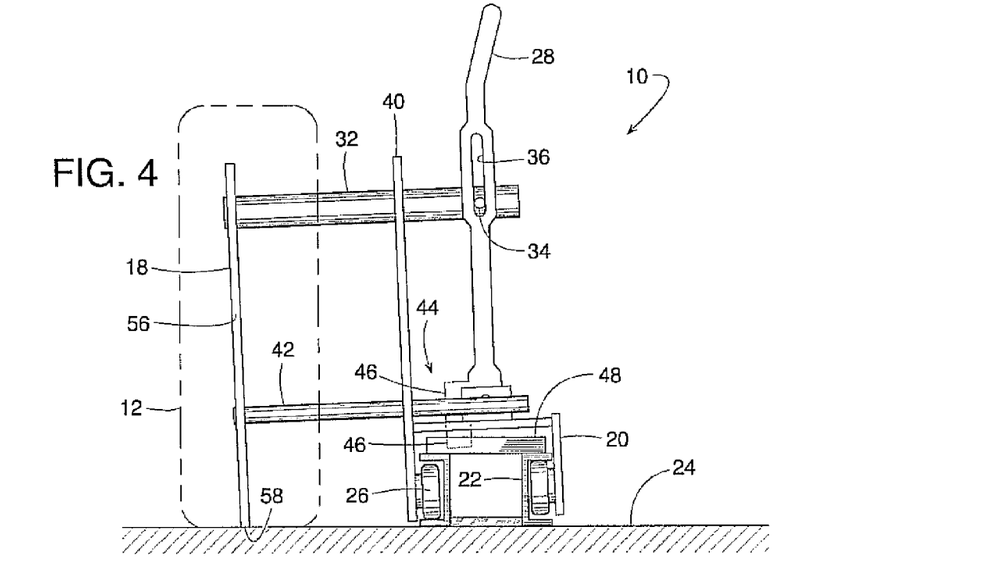
FIG. 4 is a front view of the example manual wheel restraint shown in the position of FIG. 2.

As illustrated in FIGS. 1-6, manually tilting lever 28 from its position of FIGS. 1 and 3 to that of FIGS. 2 and 4 not only extends wheel chock 18 to its operative position, but lever 28 also rotates tab 46 into engagement within a series of catches 48 on track 22. In the illustrated example, catches 48 are illustrated as a series of bars distributed along track 22. The bars are spaced a distance apart to create a series of openings. In the engaged position (FIGS. 2 and 4), tab 46 extends into a selected one of the series of openings between the bars. This limits the movement of tab 46 between two adjacent bars, which, thus limits the movement of track follower 20 and wheel chock 18 along track 22. Although catches 48 can be in form of bars, other examples of catches include, but are not limited to, a series of teeth, protrusions, pins, holes, slots, or any series of features that can be suitably engaged by a particular locking feature.

Figure 5:
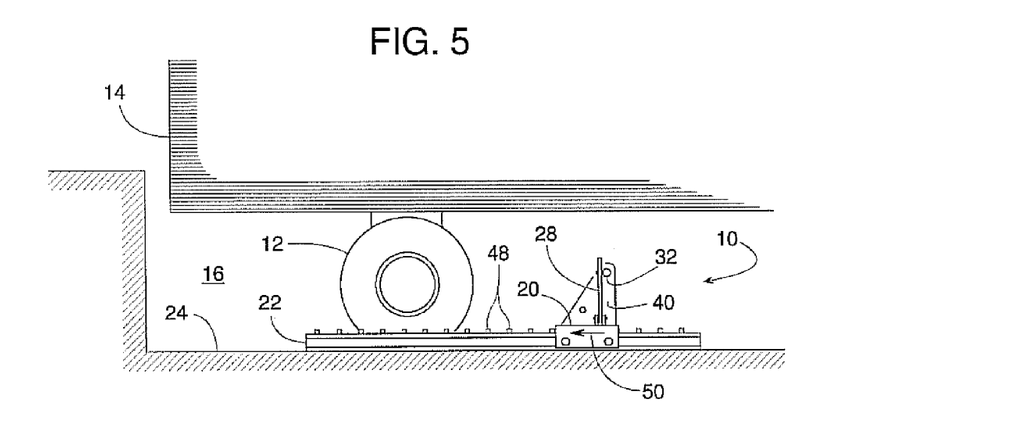
FIG. 5 is a side view of the example vehicle restraint shown in the position of FIG. 1.

A typical sequence of operation of system 10 could be as follows: 1) wheel chock 18 is retracted and positioned at some arbitrary or stored location along track 22 (e.g., FIGS. 1 and 5); 2) vehicle 14 backs into dock 16 to the position of FIG. 5; 3) with chock 18 retracted and locking feature 44 disengaged; 4) track follower 20 is manually moved along track 22 to properly position chock 18 (e.g., slightly ahead of wheel 12); 5) lever 28 is manually actuated to move chock 18 to its operative position as well as simultaneously and automatically move locking feature 44 to its engaged position, thereby obstructing wheel 12 and thus restraining vehicle 14 at dock 16. Arrow 50 represents the step of manually moving chock 18 along track 20, and arrow 52 represents manually moving chock 18 from its retracted to operative position.

To later release vehicle 14 from the vehicle restraint 10, lever 28 is manually moved from its position of FIGS. 2 and 4 to its position as shown in FIGS. 1 and 3. Moving the lever 28 to cause the wheel chock 18 to move from its operative position to its retracted position automatically disengages locking feature 44 to release track follower 20 from track 22 so that track follower 20 can then be moved to some designated stored position on track 22.

Figure 6:
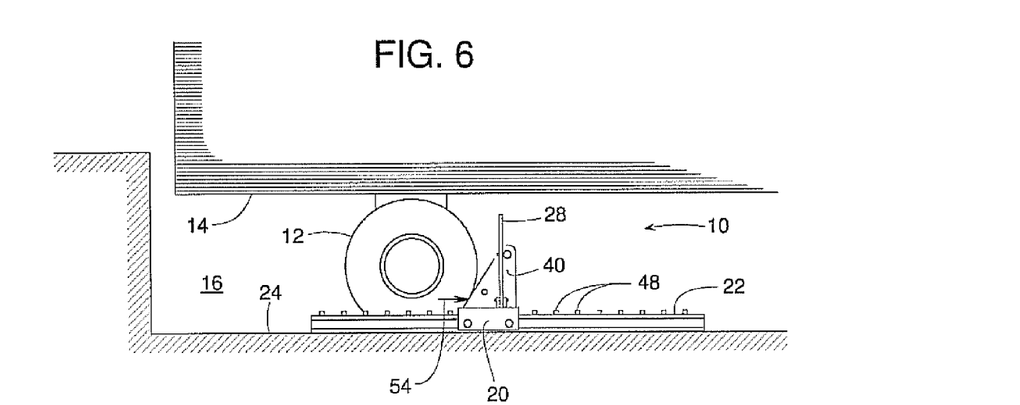
FIG. 6 is a side view of the example vehicle restraint shown in the position of FIG. 2.

When wheel chock 18 is in the operative position, chock 18 exerts a force 54 against wheel 12, as shown in FIG. 6. To prevent force 54 from causing deformation (i.e., strain) and/or stress fracture (i.e., exerting a force that exceeds the yield strength) to the rods 32 and 42, guide plate 40, track follower 20, track 22, and/or other parts of system 10, at least some of force 54 preferably is at least partially distributed or transmitted directly from wheel chock 18 to driveway 24. This can be achieved by providing chock 18 with an inclined wheel-engaging surface 56 (FIG. 2) that can wedge itself underneath wheel 12 and a lower surface 58 (FIG. 2) that can frictionally engage and thus grip driveway 24 directly. It is preferable, however, that lower surface 58 does not drag on driveway 24 when chock 18 is retracted; otherwise, such frictional drag could make it difficult to move and/or adjust the position of track follower 20 along track 22.

Protecting system 10 from excess forces while avoiding frictional drag can be accomplished by various ways. For example, the outer diameter of rollers 26 may be undersized relative to the vertical clearance provided within track 22, as shown in FIGS. 3 and 4. In this manner, when wheel chock 18 is retracted, as shown in FIG. 3, the center of gravity of track follower 20 (plus the parts thereon) is positioned to cause the track follower 20 to lay level with rollers 26 riding solidly down against track 22. However, when chock 18 extends to the operative position of FIG. 4, the center of gravity shifts sideways. This shift of the center of gravity of wheel chock 18, along with sufficient vertical clearance between rollers 26 and track 22, could possibly cause track follower 20 to tip until lower surface 58 rests upon driveway 24, as seen in FIG. 4. When chock 18 becomes wedged under wheel 12 due to inclined surface 56, wheel 12 presses chock 18 down against driveway 24. Regardless of whether lower surface 58 of wheel chock 18 engages driveway 24 due to the shift of the track follower's center of gravity causing track follower 20 to tip, and/or wheel 12 simply forcing chock 18 downward, the end result is a frictional force between lower surface 58 and driveway 24 that helps counteract force 54.

In yet other example implementations, transmitting at least a portion of force 54 directly to driveway 24 when chock 18 is in its operative position, while avoiding frictional drag when chock 18 is retracted, can be accomplished by countless other ways involving, for instance, part or component clearances, component flexibility, spring actuated rollers, spring actuated chock, etc.

Figure 7:
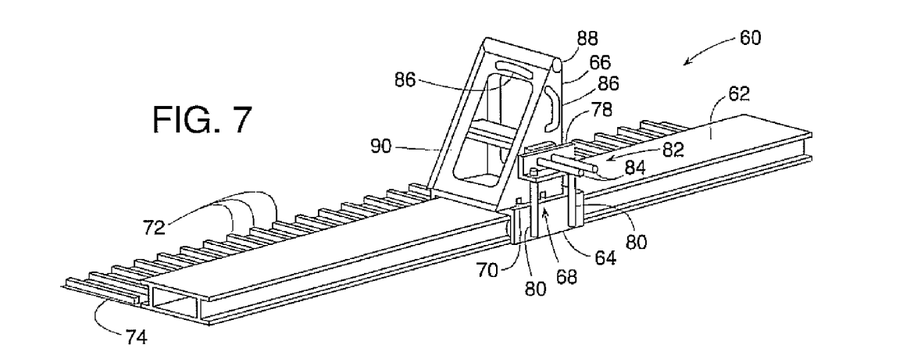
FIG. 7 is a perspective view of an alternative example manual wheel restraint illustrated in a retracted position.
Figure 8:
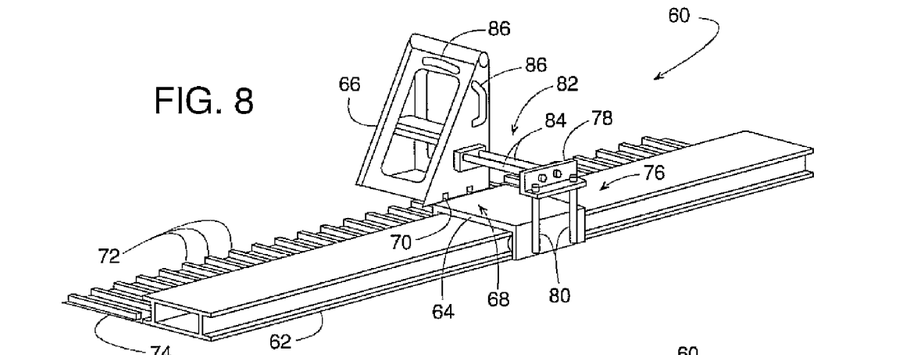
FIG. 8 is a perspective view similar to FIG. 7 but showing the restraint at an intermediate position.
Figure 9:
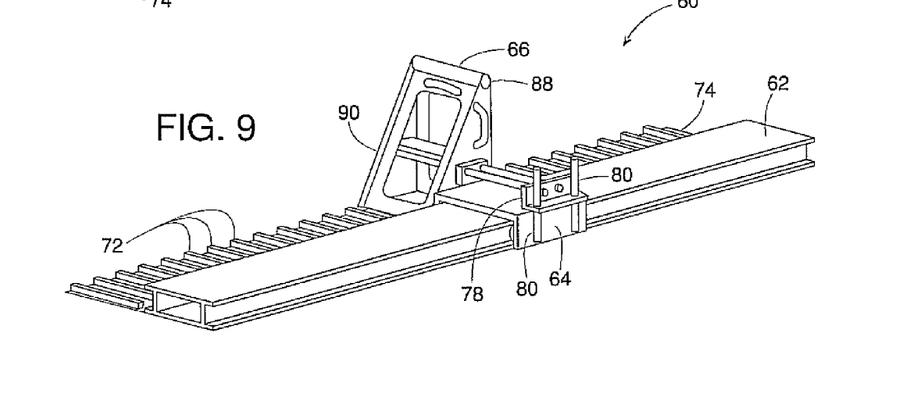
FIG. 9 is a perspective view similar to FIG. 7 but showing the restraint in an operative position.

FIGS. 7, 8 and 9, illustrate an alternative example wheel restraint system 60. Wheel restraint system 60 comprises a track 62, a track follower 64, and a wheel chock 66 coupled to track follower 64. In the illustrated example, a locking feature 68 is in the form of one or more grooves 70 on the underside of chock 66. Grooves 70 are suitable for engagement with a series of catches 72 that are in the form of rectangular bars mounted to a base plate 74. Base plate 74 can be attached to track 62 and/or driveway 24. Chock 66 is shown in a retracted position in FIG. 7, an intermediate position in FIG. 8, and an operative position in FIG. 9.

In the operative position of FIG. 9, movement of chock 66 is limited by the engagement between the bars of catches 22 and grooves 70 of locking feature 68. In the retracted position of FIG. 7, chock 66 rests atop track follower 64, and locking feature 68 disengages catches 72. The disengagement of locking feature 68 allows chock 66 and track follower 64 to be readily moved along track 62 manually.

A vertical slide mechanism 76 (FIG. 8) enables chock 66 to be manually repositioned between its intermediate position of FIG. 8 and its operative position of FIG. 9. Vertical slide mechanism 76 can be comprised of a block 78 slidingly coupled to a pair of vertical rods 80 that are rigidly attached to track follower 64. A horizontal slide mechanism 82 enables chock 66 to be manually moved between its intermediate position of FIG. 8 and its retracted position of FIG. 7. Horizontal slide mechanism 82 can be comprised of block 78 being slidingly coupled to a pair of horizontal rods 84 that rigidly extend from the side of wheel chock 66. Together, slide mechanisms 76 and 82 enable wheel chock 66 to translate both vertically and horizontally between the chock's retracted and operative positions. Handles 86 can help manually maneuver wheel chock 66.

Additionally, locking feature 68 automatically engages catches 72 as wheel chock 66 is manually moved from its retracted position of FIG. 7 to its operative position of FIG. 9.

Although in the illustrated example, an upper edge 88 of chock 66 engages a front surface of wheel 12, it is also possible to have a reversed arrangement where instead the front surface of wheel 12 engages an inclined surface 90 of chock 66.

Figure 10:
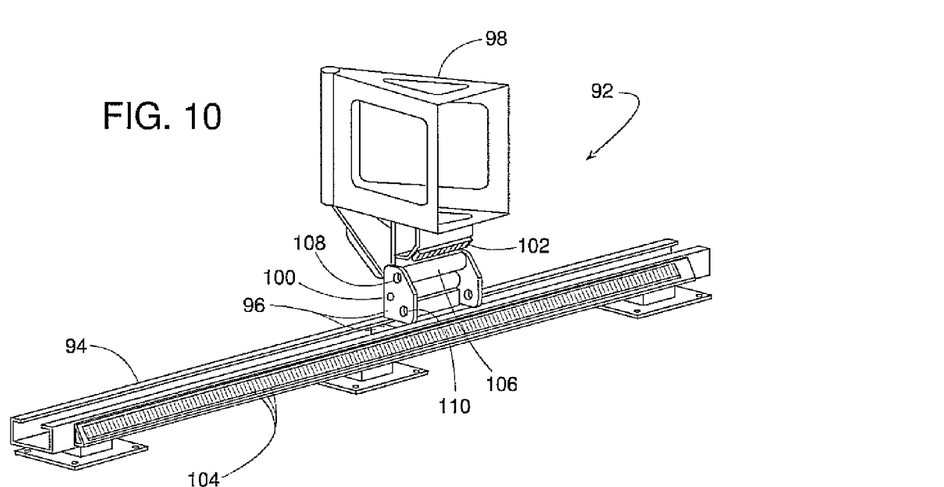
FIG. 10 is a perspective view of yet another example manual wheel restraint shown in a retracted position.
Figure 11:
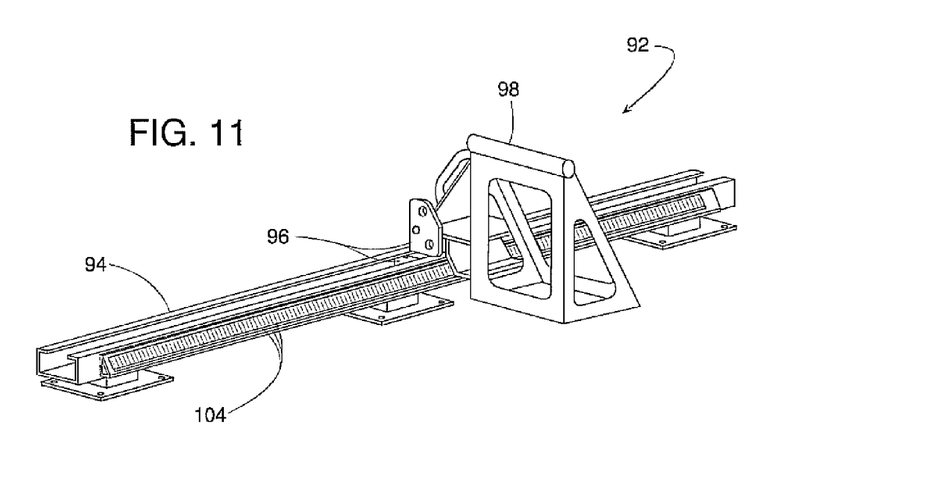
FIG. 11 is a perspective view similar to FIG. 10 but showing the restraint in an operative position.

FIGS. 10 and 11 illustrate yet another example wheel restraint system 92 that includes a track 94, a track follower 96, and a wheel chock 98 pivotally coupled to track follower 96 via a pin 100. In the illustrated example, wheel chock 98 rotates about pin 100 between a retracted position (FIG. 10) and an operative position (FIG. 11). In the retracted position, track follower 96 and chock 98 can be manually moved along track 94. When chock 98 is rotated downward to the operative position of FIG. 11, a locking feature 102 extending from chock 98 rotates into engagement with a series of catches 104 on track 94. As depicted in FIGS. 10 and 11, catches 104 comprise a gear rack, and a locking feature 102 that matingly engage to prevent the chock 98 and track follower 96 from translating or moving along track 94. Locking feature 102 is substantially similar to the gear rack, but shorter in length than the gear rack. When engaged, the two mating gear racks prevent chock 98 and track follower 96 from translating along track 94.

To restrain wheel chock 98 at its retracted or operative positions, a tube 106 can be attached to chock 98, and associated alignment holes 108 and 110 can be added to track follower 96. A removable pin (not shown) can be selectively inserted into hole 108 or 110 such that the pin extends into tube 106 to hold chock 98 at its retracted or operative positions. Additionally or alternatively, spring loaded ball plungers could be installed at holes 108 and 110, and tube 106 could provide a detent into which the plungers could extend. In other example implementations, a spring loaded ball plunger could be installed within tube 106, and holes 108 and 110 could then serve as detents for the plunger.

At least some of the aforementioned example include one or more features and/or benefits including, but not limited to, the following:

In some examples, a wheel restraint includes a wheel chock that is manually movable between a retracted position clear of a wheel of a vehicle at a loading dock and an operative position to block the path of the wheel. In the retracted position, the chock can be moved freely along a track mounted to a driveway of the dock. When the chock is manually moved from its retracted position to its operative position, a locking feature automatically restricts the movement of the chock relative to the track. When the chock is manually moved back to its retracted position, the locking feature automatically disengages.

In some examples, manual actuation of a lever moves a wheel chock between its operative and retracted positions and simultaneously moves a locking feature between its engaged and disengaged positions.

In some examples, a manual wheel chock moves both horizontally and vertically to selectively block and release a wheel of a vehicle at a loading dock.

In some examples, the wheel-holding force of a track-coupled manual wheel chock is primarily transmitted from the chock directly to the driveway of a loading dock, yet the wheel chock is spaced apart from the driveway when the chock is being repositioned along a track.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A wheel restraint system for limiting movement of a wheel of a vehicle at a loading dock that includes a driveway, the wheel restraint system comprising:
   a track mountable to the driveway;
   a track follower mounted for translation along the track;
   a wheel chock movably coupled to the track follower such that the wheel chock is manually and selectively movable between an operative position to provide a barrier to movement of the wheel away from the loading dock, and a retracted position clear of the wheel; and
   a locking feature associated with at least one of the wheel chock and the track follower, the locking feature movable between an engaged position and a disengaged position, the locking feature to limit relative movement between the track and the track follower when the locking feature is in the engaged position, the locking feature to permit greater relative movement between the track and the track follower when the locking feature is in the disengaged position, manual movement of the wheel chock from the retracted position to the operative position automatically and simultaneously causing movement of the locking feature from the disengaged position to the engaged position, and movement of the wheel chock from the operative position to the retracted position automatically and simultaneously causing movement of the locking feature from the engaged position to the disengaged position.

2. The wheel restraint system of claim 1, further comprising a lever attached to track follower and the locking feature such that upon manually moving the lever relative to the track follower, the wheel chock moves between the operative position and the retracted position, and the locking feature moves between the engaged position and the disengaged position.

3. The wheel restraint system of claim 1, wherein the track includes a series of catches that the locking feature selectively engages and disengages.

4. The wheel restraint system of claim 1, wherein the wheel chock moves substantially horizontally and substantially perpendicular to a length of the track as the wheel chock moves between the operative position and the retracted position.

5. The wheel restraint system of claim 1, wherein the wheel chock moves substantially vertically as the locking feature moves to the engaged position.

6. The wheel restraint system of claim 1, wherein the wheel chock engages the driveway when the wheel chock is in the operative position.

7. The wheel restraint system of claim 1, wherein the wheel chock in the operative position is subject to a force exerted by the wheel, wherein the force is transmitted in a shared manner to the driveway and the track.

8. The wheel restraint system of claim 7, wherein a substantial amount of the force is transmitted from the wheel chock directly to the driveway.

9. A wheel restraint system that can engage a wheel of a vehicle at a loading dock that includes a driveway, the wheel restraint system comprising:
   a track having a longitudinal axis along a length of the track;
   a series of catches distributed lengthwise in relation to the track;
   a track follower mounted for translation along the length of the track;
   a wheel chock rotatably coupled to the track follower about an axis parallel to the longitudinal axis of the track such that the wheel chock rotates between an operative position in front of the wheel and a retracted position clear of the wheel; and
   a locking feature supported by at least one of the wheel chock or the track follower, the locking feature movable between an engaged position to engage at least one catch of the series of catches and a disengaged position to disengage from the at least one catch of the series of catches, movement of the wheel chock between the retracted position and the operative position causing the locking feature to automatically move between the disengaged position and the engaged position simultaneously as the wheel chock moves between the retracted position and the operative position.

10. The wheel restraint system of claim 9, wherein the series of catches comprises a plurality of teeth.

11. The wheel restraint system of claim 9, wherein the series of catches are on the track.

12. The wheel restraint system of claim 9, wherein the series of catches are adjacent to the track.

13. The wheel restraint system of claim 9, wherein the wheel chock engages the driveway when the wheel chock is in the operative position.

14. The wheel restraint system of claim 9, wherein the wheel chock in the operative position is subject to a force exerted by the wheel, wherein the force is at least partially transmitted to the driveway and to the track.

15. The wheel restraint system of claim 14, wherein a substantial amount of the force is transmitted from the wheel chock directly to the driveway.

16. The wheel restraint system of claim 9, wherein locking feature rotates into engagement with the at least one catch.

17. A manual wheel restraint method for engaging a wheel of a vehicle at a loading dock wherein the method involves the use of a wheel chock and a track mounted to a driveway, the method comprising:

manually moving the wheel chock along a length of the track; and manually rotating the wheel chock, about an axis parallel to a longitudinal axis of the track, from a retracted position clear of the wheel to an operative position adjacent the wheel;

wherein manually rotating the wheel chock from the retracted position to the operative position causing a locking feature to automatically move between a disengaged position and an engaged position simultaneously during rotational movement of the wheel chock from the retracted position to the operative position to capture the position of the wheel chock relative to the track wherein the wheel chock's movement is limited relative to the track.

18. The method of claim 17, further comprising:

using the wheel to exert a force against the wheel chock;

transmitting a first portion of the force from the wheel chock to the driveway; and transmitting a second portion of the force from the wheel chock to the track.

19. The method of claim 18, wherein the first portion of the force is greater than the second portion of the force.

20. The method of claim 17, wherein manually moving the wheel chock from the retracted position to the operative position involves rotation of the wheel chock.

21. The wheel restraint of claim 1, wherein a wheel chock is rotatably mounted to the track follower about an axis parallel to a longitudinal axis of the track.

22. The wheel restraint system of claim 21, wherein the wheel chock rotates about the axis as the wheel chock moves between the operative position and the retracted position.

23. The wheel restraint of claim 3, wherein the locking feature rotates into engagement with the catches of the track.

\* \* \* \* \*

UNITED STATES PATENT AND TRADEMARK OFFICE
CERTIFICATE OF CORRECTION

PATENT NO. : 8,590,673 B2
APPLICATION NO. : 12/026008
DATED : November 26, 2013
INVENTOR(S) : Andersen et al.

It is certified that error appears in the above-identified patent and that said Letters Patent is hereby corrected as shown below:

In the Claims

Column 5, line 39 (claim 1), insert --, the track follower continuously mounted in engagement with the track when manually translated relative to the track-- after "the track".

Column 6, line 62 (claim 16), insert --the-- between "wherein" and "locking".

Column 7, line 6 (claim 17), insert --after positioning the wheel chock at a position along the length of the track adjacent the wheel of the vehicle-- after "wheel".

Column 8, line 10 (claim 21), delete "The wheel restraint of claim 1, wherein" and insert --A wheel restraint system for limiting movement of a wheel of a vehicle at a loading dock that includes a driveway, the wheel restraint system comprising: a track mountable to the driveway; a track follower mounted for translation along the track;-- before "a wheel chock".

Column 8, line 11 (claim 21), delete "is" between "a wheel chock" and "rotatably".

Column 8, line 12 (claim 21), insert --, the wheel chock being manually and selectively movable between an operative position to provide a barrier to movement of the wheel away from the loading dock, and a retracted position clear of the wheel; and a locking feature associated with at least one of the wheel chock and the track follower, the locking feature movable between an engaged position and a disengaged position, the locking feature to limit relative movement between the track and the track follower when the locking feature is in the engaged position, the locking feature to permit greater relative movement between the track and the track follower when the locking feature is in the disengaged position, manual movement of the wheel chock from the retracted position to the operative position automatically and simultaneously causing movement of the locking feature from the disengaged position to the engaged position, and movement of the wheel chock from the operative position to the retracted position automatically and simultaneously causing movement of the locking feature from the engaged position to the disengaged position-- after "the track".

Signed and Sealed this
Twenty-second Day of April, 2014

Michelle K. Lee
*Deputy Director of the United States Patent and Trademark Office*

CERTIFICATE OF CORRECTION (continued)

U.S. Pat. No. 8,590,673 B2

In the Claims

Column 8, line 15 (claim 23), delete "The wheel restraint of claim 3, wherein" and insert --A wheel restraint system for limiting movement of a wheel of a vehicle at a loading dock that includes a driveway, the wheel restraint system comprising: a track mountable to the driveway; a track follower mounted for translation along the track; a wheel chock movably coupled to the track follower such that the wheel chock is manually and selectively movable between an operative position to provide a barrier to movement of the wheel away from the loading dock, and a retracted position clear of the wheel; and a locking feature associated with at least one of the wheel chock and the track follower, the locking feature movable between an engaged position and a disengaged position, the locking feature to limit relative movement between the track and the track follower when the locking feature is in the engaged position, the locking feature to permit greater relative movement between the track and the track follower when the locking feature is in the disengaged position, manual movement of the wheel chock from the retracted position to the operative position automatically and simultaneously causing movement of the locking feature from the disengaged position to the engaged position, and movement of the wheel chock from the operative position to the retracted position automatically and simultaneously causing movement of the locking feature from the engaged position to the disengaged position, the track including a series of catches that the locking feature selectively engages and disengages whereby-- before "the locking feature".